United States Patent
Taylor et al.

(10) Patent No.: US 7,341,616 B2
(45) Date of Patent: Mar. 11, 2008

(54) APPARATUS AND METHOD FOR THE REMOVAL OF PARTICULATE MATTER IN A FILTRATION SYSTEM

(75) Inventors: Robert W. Taylor, Overland Park, KS (US); Charles B. Sedman, Hillsborough, NC (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 11/249,636

(22) Filed: Oct. 13, 2005

(65) Prior Publication Data

US 2006/0174768 A1 Aug. 10, 2006

Related U.S. Application Data

(60) Provisional application No. 60/650,287, filed on Feb. 4, 2005.

(51) Int. Cl.
*B03C 3/155* (2006.01)

(52) U.S. Cl. ............ 95/70; 55/341.1; 55/378; 96/55

(58) Field of Classification Search ........ 55/341.1, 55/341.4, 341.6, 372, 378; 96/55, 59; 95/63, 95/70
See application file for complete search history.

(56) References Cited

U.S. PATENT DOCUMENTS

| | | | |
|---|---|---|---|
| 3,807,137 A | 4/1974 | Romell | |
| 3,899,308 A | 8/1975 | Peterson | |
| 3,910,799 A | 10/1975 | Penney | |
| 3,915,676 A | 10/1975 | Reed et al. | |
| 3,945,813 A | 3/1976 | Iinoya et al. | |
| 3,966,435 A * | 6/1976 | Penney ................ | 96/66 |
| 4,029,482 A | 6/1977 | Postma et al. | |
| 4,039,304 A | 8/1977 | Bechthold et al. | |
| 4,147,522 A | 4/1979 | Gonas et al. | |
| 4,209,306 A | 6/1980 | Feldman et al. | |
| 4,357,151 A | 11/1982 | Helfritch et al. | |
| 4,431,434 A | 2/1984 | Rinard et al. | |
| 4,786,293 A | 11/1988 | Labadie | |
| 4,888,158 A | 12/1989 | Downs | |
| 4,904,283 A | 2/1990 | Hovis et al. | |
| 5,024,681 A | 6/1991 | Chang | |
| 5,059,219 A * | 10/1991 | Plaks et al. ............ | 96/77 |
| 5,158,580 A | 10/1992 | Chang | |
| 5,217,511 A | 6/1993 | Plaks et al. | |
| 5,364,457 A | 11/1994 | Cameron | |
| 5,549,735 A | 8/1996 | Coppom | |
| 5,632,791 A | 5/1997 | Oussoren et al. | |
| 5,746,792 A | 5/1998 | Clements et al. | |
| 5,792,238 A | 8/1998 | Johnson et al. | |
| 6,152,988 A | 11/2000 | Plaks et al. | |
| 6,171,376 B1 | 1/2001 | Hironaka et al. | |

(Continued)

FOREIGN PATENT DOCUMENTS

JP 360177614 A 9/1985

*Primary Examiner*—Richard L. Chiesa
(74) *Attorney, Agent, or Firm*—Armstrong Teasdale LLP

(57) ABSTRACT

A particulate filtration system for removing particulates suspended in a fluid include, in an exemplary embodiment, a filter element and a pre-collector body component operably connected to the filter element. The pre-collector body component is capable of receiving an electrical charge to attract and remove particles suspended in the fluid.

18 Claims, 5 Drawing Sheets

U.S. PATENT DOCUMENTS 6,203,591 B1 3/2001 Clements et al.
6,251,170 B1 6/2001 Hironaka et al.

7,182,803 B2 * 2/2007 Stewart et al. ................ 95/269

* cited by examiner

APPARATUS AND METHOD FOR THE REMOVAL OF PARTICULATE MATTER IN A FILTRATION SYSTEM

CROSS REFERENCE TO RELATED APPLICATIONS

This application claims the benefit of Provisional Patent Application No. 60/650,287 filed Feb. 4, 2005.

STATEMENT REGARDING FEDERALLY SPONSORED RESEARCH AND DEVELOPMENT

None.

BACKGROUND OF THE INVENTION

The present invention relates generally to a filtration system and apparatus for removing particulate matter from a stream of gas or other fluid. More specifically, the present invention encompasses a filtration system that includes an electrostatic pre-collector apparatus and a fabric filter element for removing particulate matter from a stream of gas or other fluid.

Fabric filtration is a common technique for separating out particulate matter in a gas stream. In an industrial setting, fabric filtration is often accomplished in a device known as a baghouse. Generally, a baghouse includes a housing that has an inlet for receiving dirty, particulate-laden gas and an outlet through which clean gas leaves the baghouse. The interior of the housing is divided by a tube sheet into a dirty gas or upstream plenum and a clean gas or downstream plenum, with the dirty gas plenum in fluid communication with the inlet and the clean gas plenum in fluid communication with the outlet. The tube sheet typically includes a number of apertures and supports a number of filter elements with each filter element covering one of the apertures.

Generally, a filter element includes a support structure and a fabric filter media. The support structure, which is also called a core, typically has a cylindrical shape and is hollow. The walls of the support structure may be similar to a screen or a cage, or may simply include a number of perforations, so that a fluid may pass through the support structure. The support structure will have at least one end that is open and that is capable of being coupled to the tube sheet at an aperture. Customarily, the structure will extend from the tube sheet into the dirty gas plenum. There are several types of fabric filter media. A "bag" filter media is flexible and/or pliable and is shaped like a bag. A cartridge filter media is typically relatively rigid and pleated. Filter media are ordinarily mounted around the exterior or outer portion of the support structure.

In operation, particulate laden or dirty gas is conducted into the baghouse, and more specifically into the dirty gas plenum, through the inlet. The gas then flows through the fabric filter media to the interior space within the filter cores. As the gas flows through the filter media, the particulate matter carried by the gas engages the exterior of the filter media and either accumulates on the filters or falls to the lower portion of the dirty gas plenum. Thereafter, the cleaned gas flows through the apertures in the tube sheet and into the clean gas plenum. The clean gas then flows out of the baghouse through the outlet.

As particulate matter accumulates or cakes on the filters, the flow rate of the gas is reduced and the pressure drop across the filters increases. To restore the desired flow rate, a reverse pressure pulse may be applied to the filters. The reverse pressure pulse expands the filter media and separates the particulate matter, which falls to the lower portion of the dirty gas plenum. While filter material technology has advanced sufficiently to allow a given filter element to be cleaned in this manner tens of thousands of times before replacement is needed, further extension of a filter's useful life is economically desirable. Extended filter life not only saves the cost of filters, it also saves the cost of filter replacement, which is often difficult, costly and requires the baghouse to be taken out of service for a period of time.

Another common technique for separating particulate matter from a gas stream is to use an electrostatic device, such as an electrostatic precipitator. In this device, particulate matter is electronically charged and then collected through the action of an electric field. A typical electrostatic device provides a discharge electrode that is maintained at a high voltage and a non-discharge electrode that is maintained at a relatively lower voltage or at ground. As the particulate-laden gas steam flows past the electrodes, the electric field present between the electrodes operates to charge a percentage of the passing particles and causes them to collect on the non-discharge electrode.

BRIEF SUMMARY OF THE INVENTION

In order to provide an efficient filtration system that has a longer useful life, in one embodiment the present invention is directed to an industrial filtration system that includes fabric filters and an apparatus that provides pre-collection of particulate matter. While an industrial baghouse is often thought of as useful for cleaning gas after a process, such as combustion, the filtration system of the present invention can be used in other applications, such as for gas turbine intake filtration.

The baghouse filtration system of the present invention includes a housing that is divided into a first plenum and a second plenum by a tube sheet. The tube sheet is substantially planar and includes a number of spaced-apart apertures that extend through the sheet. The system further includes a number of filter elements, with each filter element coupled to the tube sheet at an aperture. The system also includes at least one pre-collector body component and at least one discharge electrode. Each body component is positioned in close proximity to the lower end of a filter element. Each discharge electrode is positioned some distance away from the body components. Preferably, each body component is coupled to the lower end of a filter element. Each body component and discharge electrode is coupled to a voltage source or sources so that there is an electrical potential present between them. In one embodiment, each body component is electrically coupled to ground and each discharge electrode is electrically coupled to a negative voltage. A body component may have any one of a number of shapes. In one embodiment, each body component is cylindrical and has a continuous sidewall. In a further embodiment, each body component sidewall is perforated.

In operation, particulate-laden gas enters the first plenum through an inlet. Once in the first plenum, the gas passes adjacent to the pre-collector apparatus where the difference in the electrical potential between the discharge electrode and the body component causes at least a portion of the particulate matter in the gas to collect on the body component. Thereafter, the gas passes through a filter element causing particulate matter still carried by the gas to engage the exterior of the filter element and either accumulate on the filter element or separate from the gas and fall to the lower portion of the first plenum. The gas then passes from the interior space of the filter assembly through an aperture in the tube sheet and into the second plenum. The gas exits the system through an outlet.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION OF THE INVENTION

Figure 1:
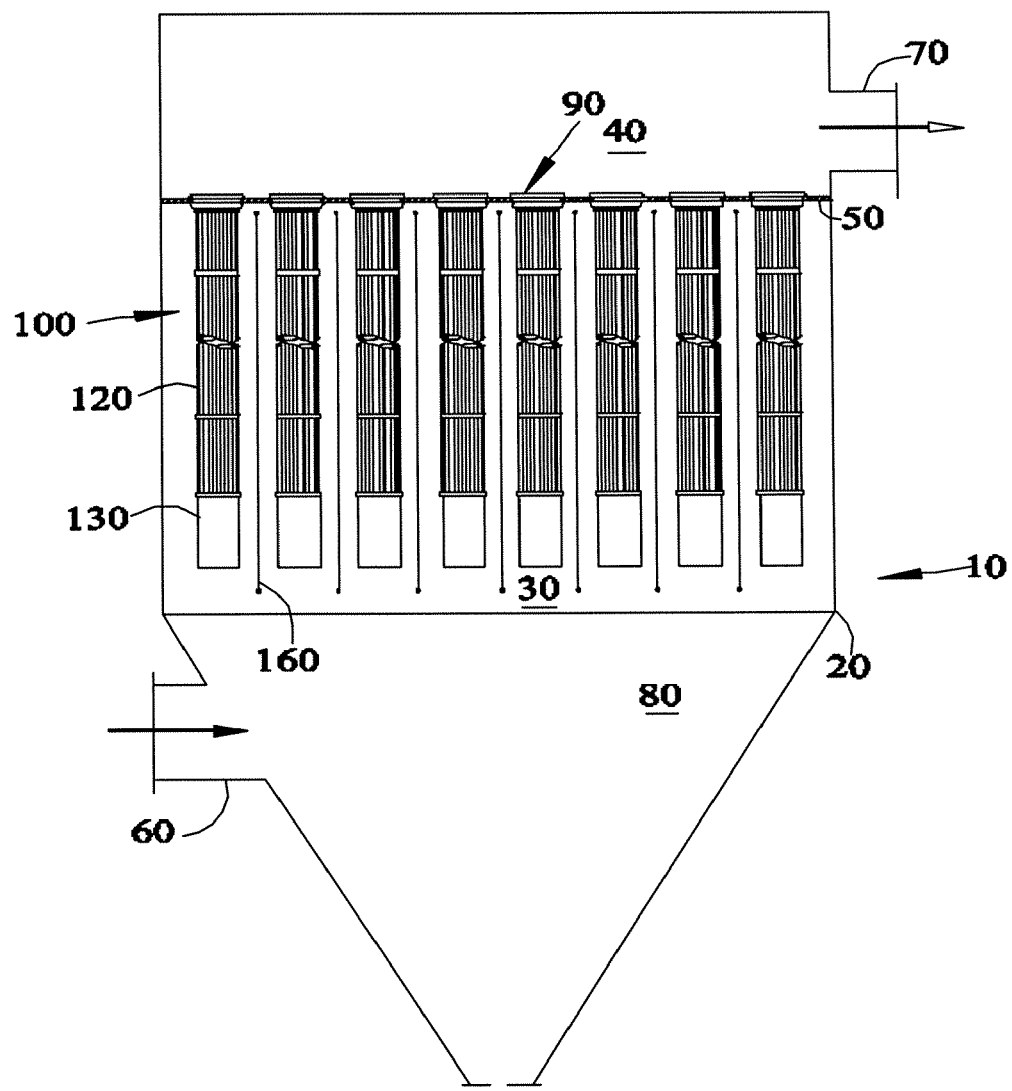
FIG. 1 is a schematic view, partly in section, of a filtration system according to one embodiment of the present invention.

A filtration system 10 according to one embodiment of the present invention is illustrated in FIG. 1. The filtration system 10 generally includes an enclosed housing 20 and a plurality of filter assemblies 100. Each filter assembly 100 includes a filter element 120 and a pre-collector body component 130 extending below and attached to the filter element 120. The system 10 also includes a pre-collector discharge electrode 160. Dirty gas enters the housing 20 and clean gas leaves. More specifically, the dirty gas passes adjacent to the pre-collector body components 130 and discharge electrodes 160 which operate to remove at least a portion of the particulate matter in the dirty gas. Thereafter, the gas passes through the filter elements 120 where additional particulate matter is removed. Because of the operation of the pre-collector body components 130 and discharge electrodes 160, however, the filter elements 120 have less particulate matter to remove and, therefore, the filter material of the filter elements will require fewer cleaning cycles for a longer useful service life.

The housing 20 is divided into a first plenum 30 and a second plenum 40 by a tube sheet 50. A suitable material for both the housing 20 and the tube sheet 50 is metal plate. The housing 20 also includes an inlet 60 that is in fluid communication with the first plenum 30 and an outlet 70 that is in fluid communication with the second plenum 40. An accumulation chamber 80 is located at the lower end of the first plenum 30 and is defined by irregularly shaped and sloped walls. For example, the accumulation chamber 80 has a V-shaped cross-section, as illustrated in FIG. 1.

At least a portion of the tube sheet 50 is substantially planar. The tube sheet 50 includes a plurality of apertures, such as aperture 90, that extend through the planar portion of the sheet 50. FIG. 1 shows a number of filter assemblies 100 hanging from the tube sheet 50 and extending through the apertures 90 in the sheet 50. Each filter assembly 100 is supported at its upper end by the tube sheet 50 and hangs downwardly in a substantially vertical direction. It should be understood that in operation, there is a filter assembly 100 associated with each aperture 90 in the sheet 50. Also, the filter assemblies 100, as illustrated, do not extend into the accumulation chamber 80, but it should be apparent that filter assemblies could be made with a length that allowed them to extend into the accumulation chamber 80.

Each filter assembly 100 includes a filter element 120 and a pre-collector body component 130. The pre-collector body component 130 is coupled to and supported by the lower end of the filter element 120. A pre-collector discharge electrode 160 hangs vertically between the filter assemblies 100.

It should be understood that the filter assemblies 100 may be arrayed in a vertically extending matrix in a typical housing 20 as is known in the baghouse industry. The discharge electrodes 160 may be positioned in a number of different locations within the typical baghouse. For example, as indicated in FIG. 1, the discharge electrodes 160 may be positioned in their own rows and columns between and aligned with the filter assemblies 100. Alternatively, the discharge electrodes 160 may be offset from those devices so that in effect, the discharge electrodes are positioned at the center of each square of four filter assemblies 100. It is also within the scope of this invention for the discharge electrodes 160 to be positioned between every other or every third filter assembly 100 or square of four filter assemblies 100. Of course, additional locations for the discharge electrodes 160 are also within the scope of this invention.

Figure 2:
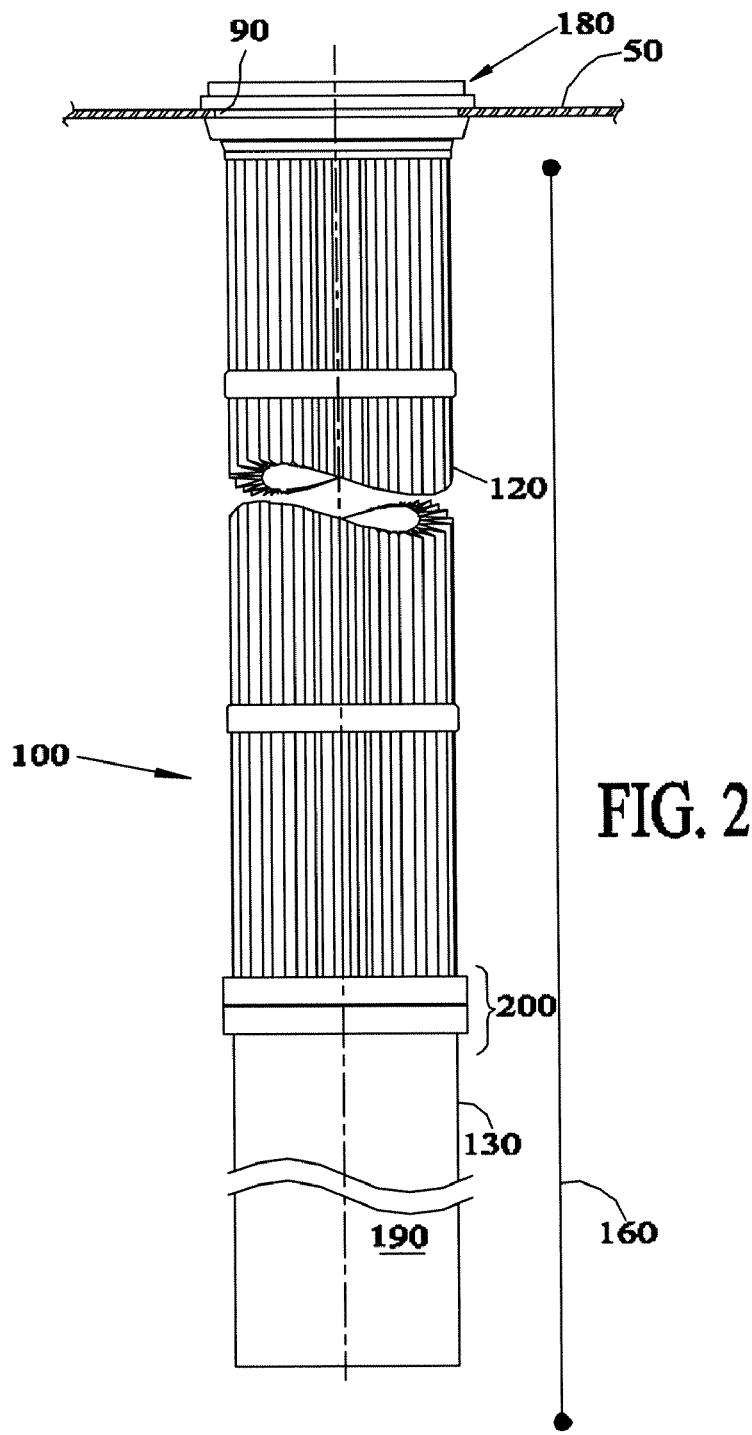
FIG. 2 is an elevational view of one embodiment of a filter assembly and pre-collector apparatus according to the present invention.

In one embodiment, the filter assembly 100 (FIG. 2) is coupled to the tube sheet 50 at an aperture 90 by a collar 180. Although the filter assembly 100 is shown having a circular cross section, it will be apparent that any suitable configuration cross section could be used, such as an oval or a rectangle. The pre-collector body component 130 is coupled to the filter element 120 at a connection 200, so that the pre-collector body component 130 extends co-axially with the filter element 120 upstream from the filter element 120. The collar 180 and the connection 200 will be described below.

The filter element 120 preferably includes a pleated filter media. The pleated filter media is formed in a substantially tubular shape with accordion folds at its inner and outer peripheries. The pleated filter media may be constructed of any suitable material for a desired filtering requirement.

The pre-collector body component 130 preferably has a tubular shape. It should be understood that the pre-collector body component 130 is not limited to this shape and that other shapes are included within the scope of this invention, such as a rectangular or oval shape. The pre-collector body component 130 is made of any suitable electrically conductive material or, alternatively, is coated by any suitable electrically conductive material. Preferably, the pre-collector body component 130 is made substantially of metal such as conductive carbon steel. In this embodiment, the outer surface or sidewall 190 of the pre-collector body component 130 is substantially continuous, that is, it has no holes or perforations.

The discharge electrode 160 extends vertically and is spaced a short distance horizontally from the pre-collector body component 130. The discharge electrode 160 is made from an electrically conductive material such as a thin wire of stainless steel. In operation, as will be discussed later, the discharge electrode 160 is electrically coupled to a voltage source, so that it obtains and maintains an electric potential or charge relative to the pre-collector body component 130. In one embodiment, the discharge electrode 160 is coupled to line voltage through a transformer and rectifier (not shown) so that the discharge electrode is maintained at a voltage potential between negative 20,000 and negative 50,000 volts DC. The discharge electrode 160 may be entirely or partially shielded (i.e. only that length that corresponds to the length of the pre-collector body component 130) to lessen the likelihood that electrical current will arc between the pre-collector body component 130 and the discharge electrode 160. Shielding is suggested if the discharge electrode 160 is to be placed in close physical proximity to the pre-collector body component 130 or if the electric potential or charge provided to the discharge electrode 160 and/or the pre-collector body component 130 is notably large relative to the distance between the pre-collector body component 130 and the discharge electrode 160.

Figure 3:
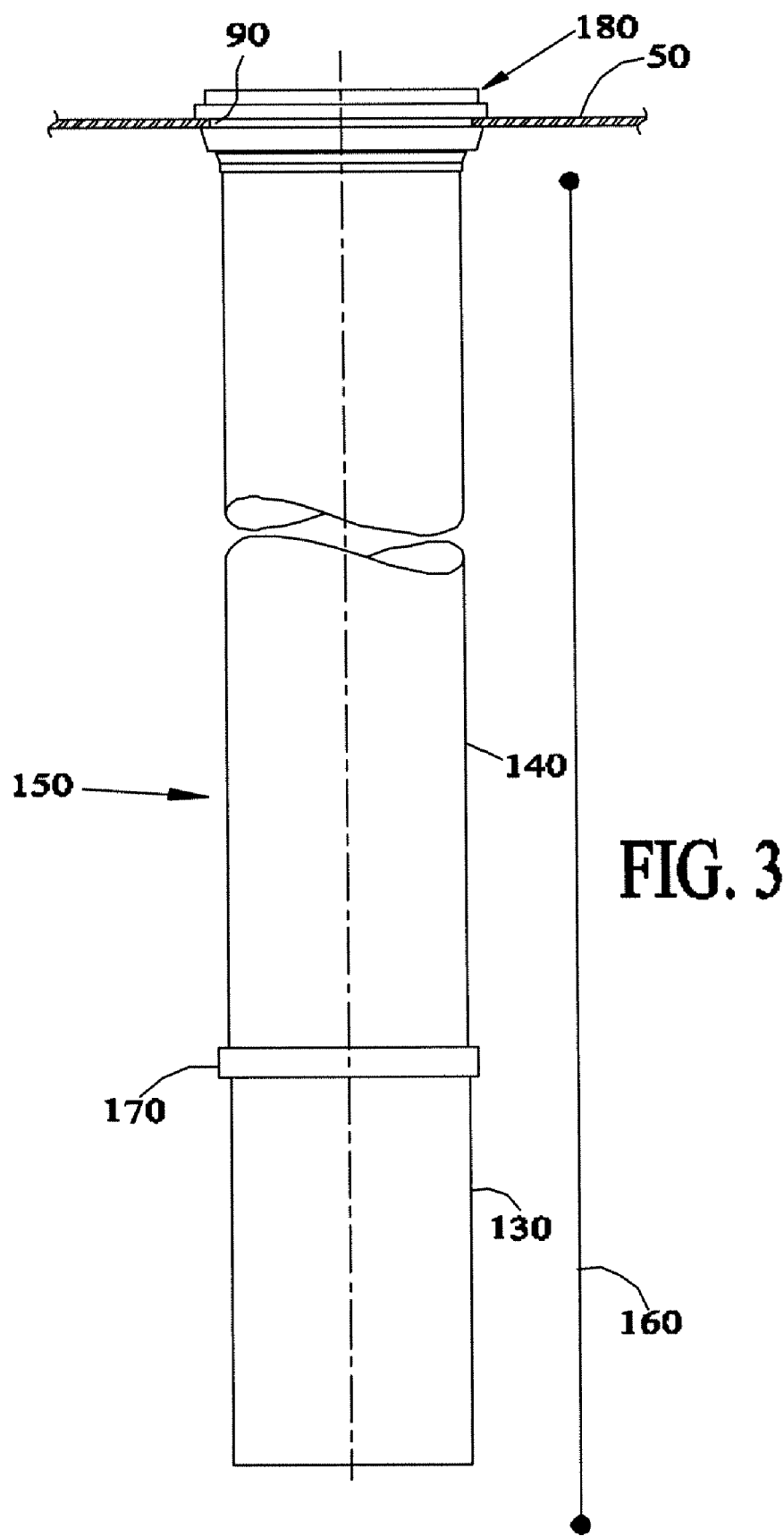
FIG. 3 is an elevational view of a second embodiment of a filter assembly and pre-collector apparatus according to the present invention.

Another embodiment of a filter assembly 150 coupled to the tube sheet 50 at an aperture 90 by a collar 180 is illustrated in FIG. 3. In this embodiment, the filter assembly 150 includes a bag filter element 140 instead of a pleated filter element 120. The bag filter element 140 is made from a flexible, pliable fabric. The fabric may be any suitable material for the desired filtering requirement. The pre-collector body component 130 is coupled to the filter bag element 140 at a connection 170, so that the pre-collector body component 130 extends co-axially with the filter bag element 140 upstream from the bag filter element.

Figure 4:
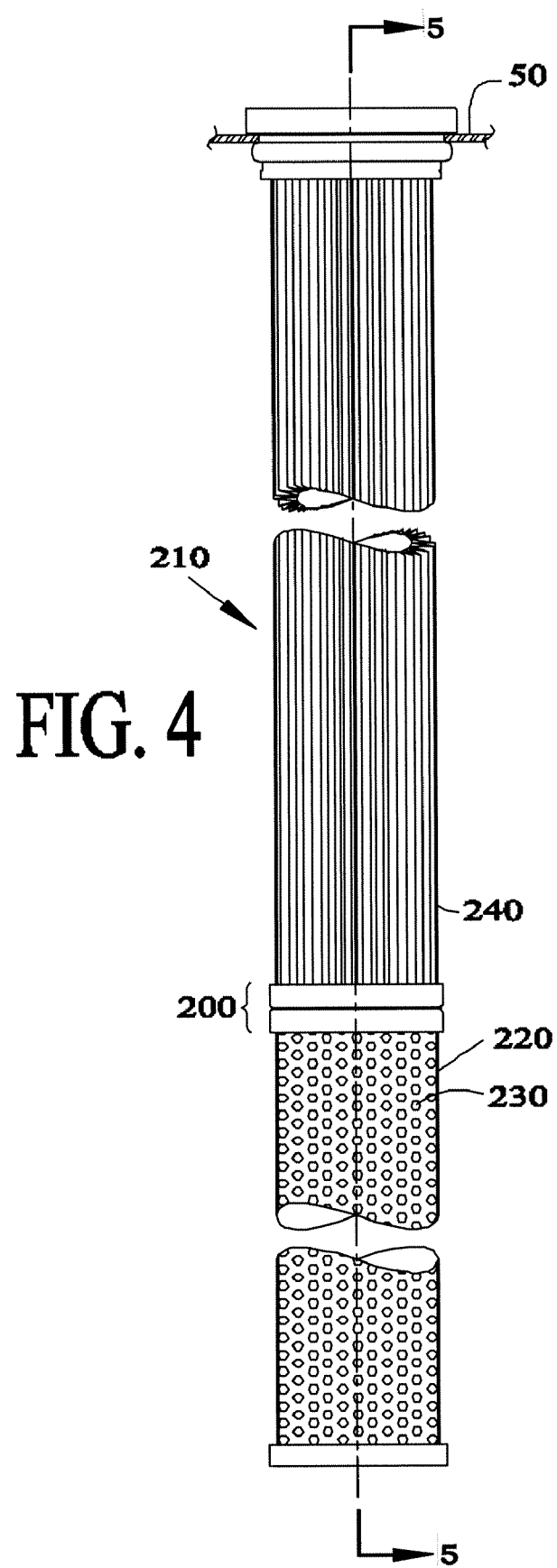
FIG. 4 is an elevational view of another embodiment of a filter assembly and pre-collection apparatus according to the present invention.

A filter assembly 210 according to another embodiment includes a pre-collector body component 220 is illustrated in FIG. 4. In this embodiment, filter assembly 210 also includes a pleated filter element 240. Also in this embodiment, the pre-collector body component 220 is a hollow tube that has a plurality of apertures or perforations 230 extending therethrough. Preferably, the pre-collector body component 220 has approximately 30% to 60% of its surface area occupied by the apertures 230. The primary function of the apertures 230 is to reduce the weight of the pre-collector body component 220. As with the previous embodiment, the pre-collector body component 220 may be made from or coated by any suitable electrically conductive material. One such suitable material that the pre-collector body component 220 could be made from is carbon steel.

Figure 5:
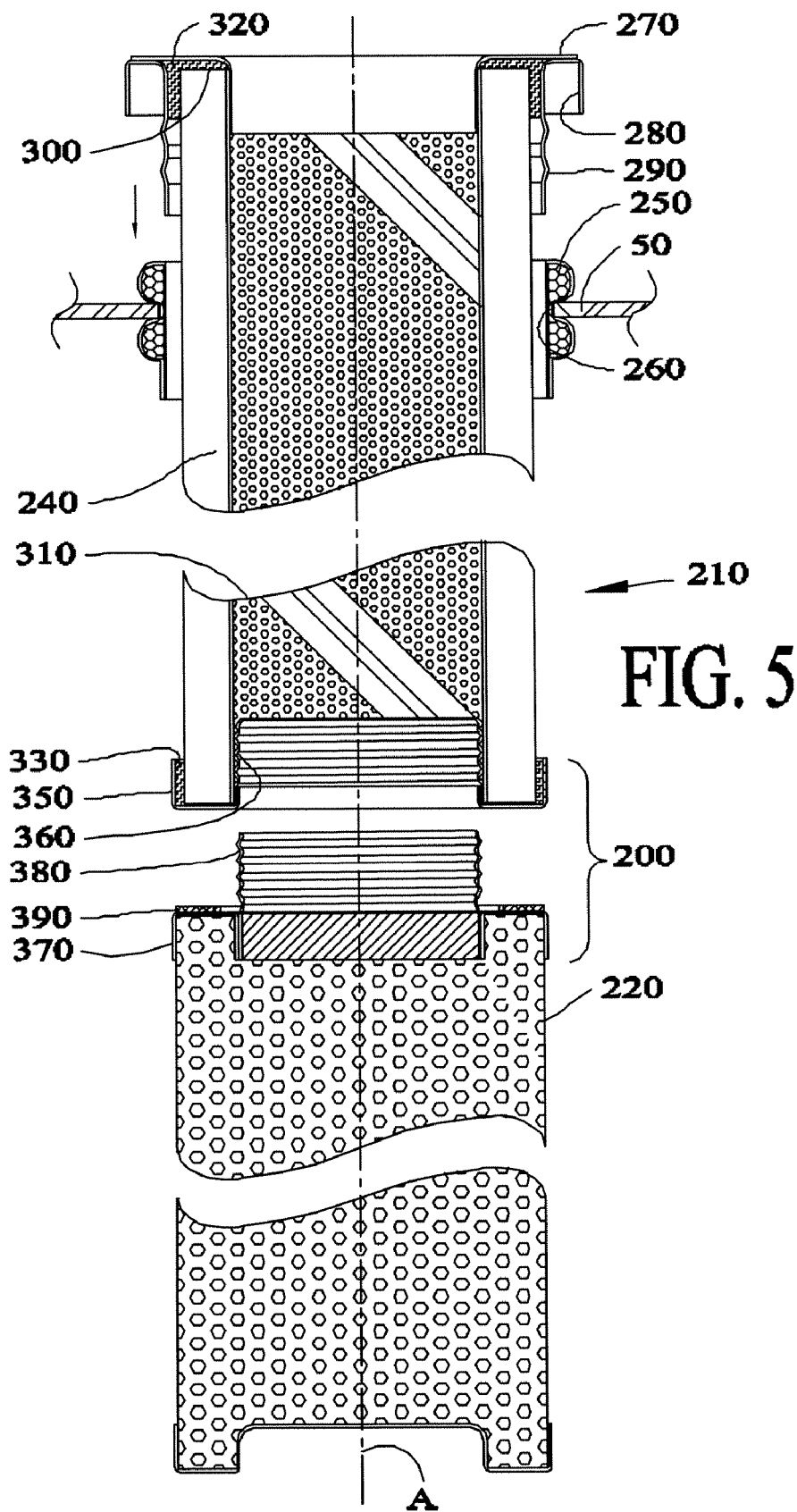
FIG. 5 is an exploded sectional view of the filter assembly and pre-collection apparatus illustrated in FIG. 4, taken approximately along the line 5-5 in FIG. 4.

The filter assembly 210 is illustrated in FIG. 5 as partially installed. The filter assembly 210 extends through an aperture 260 in the tube sheet 50 and through a resilient mounting band 250. The band 250 ensures that the filter assembly 210 may be used with apertures that have not been precisely cut. The band 250 includes resilient metal, such as a stainless steel, and is covered with fabric. The band 250 is constructed with an outer diameter substantially equal to the inner diameter of the aperture 260 and may be easily deformed and inserted into the aperture 260 so that the exterior surface of the band 250 will snugly engage the surface defining the aperture 260. The band 250 provides a seal between the filter assembly 210 and the aperture 260 in the tube sheet 50. The band 250 is described in detail in U.S. Pat. No. 5,746,792, which is assigned to the assignee of the present invention and fully incorporated herein by reference.

Filter assembly 210 also includes a mounting sleeve 270 located at its upper end to attach the filter assembly 210 to the tube sheet 50. The mounting sleeve 270 is made from a suitable material, such as stamped, drawn or otherwise formed metal. The mounting sleeve 270 defines an open end of the filter assembly 210 for fluid communication with the clean gas plenum 40. The mounting sleeve 270 is shaped so as to include a channel 280 for receiving a part of the band 250 when the filter is moved into an operational position. The mounting sleeve 270 further includes a tubular portion 290 that is adapted to be located within and extend through the aperture 260 in the tube sheet 50 and through the band 250.

A core 310 is fixed to and extends from the mounting sleeve 270. The core 310 is made from a suitable material, such as perforated sheet metal, expanded metal, or mesh screen. A radially inner channel 300 in the mounting sleeve 270 receives an upper end of the core 310. The upper end of the core 310 and the mounting sleeve 270 sleeve are connected together in a suitable manner, such as by welds, rivets, fasteners, or metal deformation. Thus, a relatively strong connection and structure exists that is capable of supporting the weight of the filter assembly 210 as it hangs from the tube sheet 50 even when the filter assembly has a relatively heavy accumulation of particles. Additionally, the connection establishes electrical communication between the mounting sleeve 270 and the core 310 so that these structures will have the same electrical potential.

A pleated filter element 240 is located concentrically around the core 310. The pleated filter element 240 is formed in a substantially tubular shape about the perimeter of the core 310 with accordion folds at its inner and outer peripheries. The pleated element 240 may be constructed of any suitable material for a desired filtering requirement. The upper end of the pleated element 240 is also located in the channel 300 of the mounting sleeve 270 and placed in a potting material 320, which acts to seal the pleated element and the mounting sleeve. The pleated element 240 could be located radially inward of the core 310.

The filter element 240 and the pre-collector body component 220 are connected by a threaded connection 200. The threaded connection 200 includes a collar 350 located at the lower end (as viewed in FIG. 4) of the filter assembly 210. The collar 350 has a receiving internally threaded portion 360. The collar 350 is fixed to the core 310 and/or filter element 240 in a suitable manner such as by welds, rivets, fasteners or metal deformation and, as in this embodiment, it may also be sealed to pleated filter element 240 by an potting material 330. The connection between the collar 350 and the core 310 establishes electrical communication between these two structures so that they have the same electrical potential.

The threaded connection 200 also includes a collar 370 located at the upper end of the pre-collector body component 220. The collar 370 has an externally threaded tubular portion 380 for threaded engagement with the receiving portion 360. The collar 370 is fixed to the pre-collector body component 220 in a suitable manner such as by welds, rivets, fasteners or metal deformation. Thus, electrical communication is established between the collar 350, the collar 370 and the pre-collector body component 220 so that these structures have the same electronic potential.

A compressible gasket 390 is located between a lower end surface of the collar 350 of the filter assembly 210 and an upper end surface of the collar 370 of the pre-collector body component 220. The gasket 390 compresses as the filter element 240 and the pre-collector body component 220 are connected together when filter element 240 and the pre-collector body component 220 are relatively rotated about a longitudinal central axis A to engage the threaded portions 360, 380 and thread the collar 370 into the collar 350. The connection device 200 has a size capable of fitting through the effective size of the apertures 90 or 260 in the tube sheet 50 and a strength sufficient to support the operational weight of the pre-collector body component 220. Of course, it should be understood that other connection devices, such as a clamp or the like, may be employed in alternate embodiments to connect the filter assembly and pre-collector apparatus body component.

It should be understood that the sidewall of pre-collector body component 220 is electrically coupled to the tube sheet 50. This electrical connection is accomplished through a series of physical connections. First, the sidewall of body component 220 is in contact with the collar 370, which, in turn, is in contact with the collar 350 when the pre-collector body component 220 is installed on the filter assembly 210. The collar 350 is in physical contact with the core 310, and the core 310 is in physical contact with the mounting sleeve 270. Mounting sleeve 270, in turn, is in contact with the mounting band 250, which is in contact with the tube sheet 50. Finally, the tube sheet 50 is in contact with the housing 20. Thus, the pre-collector body component 220 will have the same electric potential as the housing 20. As stated earlier, preferably, the pre-collector body component 220 is also grounded since the housing 20 is grounded.

For operation, the discharge electrode 160 and pre-collector body component 220 (FIG. 3 or 4), 130 (FIG. 2) have a difference in voltage potential. Thus, as stated earlier, in one embodiment the discharge electrode 160 is coupled to line voltage through a transformer and rectifier (not shown) so that the discharge electrode 160 is maintained at a voltage potential between negative 20,000 and negative 50,000 volts DC and the body component 220 (FIG. 3 or 4), 130 (FIG. 2) is grounded. It should be understood that the discharge electrode 160 could be provided with a positive electrical potential or that the voltages may be reversed. Of course, precautions such as insulation and shielding prevent electrical contact between the discharge electrodes 160 and the pre-collector body component 220 (FIG. 3 or 4), 130 (FIG. 2), the tube sheet 50, and/or the housing 20.

In operation, particulate-laden gas enters the first plenum 30 (FIG. 1) through the inlet 60. A fan (not shown) may be utilized to cause the gas to move through system 10. Once in the first plenum 30, the gas passes adjacent to the pre-collector body components 130 and the discharge electrodes 160. The pre-collector body components 130 and discharge electrodes 160 are separately coupled to a power source or to ground so that an electrical potential difference exists between these components. This electrical potential difference causes at least a portion of the particulate matter in the gas to collect on the pre-collector body components 130. No electrical field or potential is intentionally created across the filter element 120 of the filter assembly 100.

Thereafter, the gas passes through the filter elements 120 (FIG. 2) and into the interior of the filter assemblies 100, which will cause particulate matter carried by the gas to separate by the filter elements and either accumulate on or in the filter elements or separate from the gas and fall to the lower portion 80 of the first plenum 30. Next, the cleaned gas passes from the interior of the filter assemblies 100 through an aperture 90 in the tube sheet 50 and into the second plenum 40. Ultimately, the cleaned gas will exit the system 10 through the outlet 70.

As stated, the pre-collector body components 130 and discharge electrodes 160 are separately coupled to a power source or to ground so that an electrical potential difference exists between these elements. Typically, particles have a negative charge and, therefore, will be repelled by a negatively charged item. Thus, preferably, the pre-collector discharge electrodes 160 are electrically coupled to a large negative voltage and the pre-collector body components 130 are electrically coupled to ground, which should tend to cause particles to collect on the pre-collector body components.

Conventional baghouse filtration systems require a diverse mix of particles sizes to exhibit acceptable pressure drop values across the filter elements. As the size distribution of incoming particles decreases in a conventional fabric filter, the system pressure drop will increase and pulse cleaning intervals will decrease. In other words, as the particle size becomes more uniform, the system pressure drop increases requiring more frequent cleaning. Fine dust tends to create a very compact dust layer on the surface of the filter elements, which drives up system pressure drop.

The electrically stimulated fabric filtration system of the present invention overcomes this problem by charging the incoming particles. The relatively larger particles are more readily charged than the relatively smaller particles, and, therefore, these larger particles are more likely to attach to the pre-collector bodies 130, leaving smaller "like" charged particles to gather on the surface of the filter element. These "like" charged smaller particles tend to repel one another on the surface of the filter element, which creates a more porous dust layer. As a result, combining pre-cleaning of the particle burden with an electrically stimulated fabric filter reduces or eliminates the pressure drop problems experience by conventional pulse jet filter systems and thereby increases the useful life to the filter elements.

Particles may accumulate on the pre-collector body components 130, 220 over time. It is contemplated that such accumulation of particles may require periodic cleaning. One suitable way to clean the pre-collector body components 130, 220 is to dislodge the accumulation of particles with acoustic energy by known acoustic horns.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A particulate filtration system for removing particulates suspended in a fluid, the system comprising:
    a filter element having a first end and a second end; and
    a pre-collector body component operably connected to the filter element and capable of receiving an electrical charge to attract and remove particles suspended in the fluid, said pre-collector body component comprising a substantially continuous sidewall surface, an open first end, and a closed second end, said open first end of said pre-collector body component connected to said second end of said filter element.

2. The system of claim 1 further including a discharge electrode spaced apart from the body component, the discharge electrode capable of receiving an electrical charge causing a difference in the electronic potential between the body component and the discharge electrode.

3. The system of claim 2 wherein the difference in the electric potential between the body component and the discharge electrode is at least 20,000 volts.

4. The system of claim 1 wherein the end of the pre-collector body component is operably connected to the second end of the filter element by a threaded connection.

5. The system of claim 1 wherein the pre-collector body component is made substantially of metal.

6. The system of claim 1 wherein the pre-collector body component comprises a cylindrical tube having a substantially continuous sidewall surface, an open first end, and a closed second end.

7. The system of claim 6 wherein the cylindrical tube includes a number of apertures extending through the tube's sidewall surface.

8. The system of claim 1 wherein the pre-collector body component is positioned upstream of the filter element.

9. The system of claim 1 wherein the pre-collector body component is positioned coaxially of the filter element portion.

10. A filter assembly for use in a particulate filtration system, the system including a housing divided into a first plenum and a second plenum by a tube sheet with the first plenum in fluid communication with an inlet and the second plenum in fluid communication with an outlet, the tube sheet defining an aperture extending between the first plenum and the second plenum, the system further including a discharge electrode coupled to a first electric potential, the filter assembly comprising:
  a support frame having a first end that is adapted to couple to the tube sheet at an aperture and a second end;
  a filter media positioned around the periphery of the support frame; and
  a pre-collector body component comprising a substantially continuous sidewall surface, an open first end, and a closed second end, said pre-collector body component open first end coupled to the second end of the support frame, the pre-collector body component being electrically coupled to a second electric potential;
  wherein the difference in the first electric potential and the second electric potential is operable to cause at least a portion of the particulates in the first plenum to collect on the pre-collector body component.

11. The filter assembly of claim 10 wherein the pre-collector body component is made substantially of metal.

12. The filter assembly of claim 10 wherein the pre-collector body component includes a cylindrical tube having a substantially continuous sidewall surface, an open first end, and a closed second end.

13. The filter assembly of claim 12 wherein the cylindrical tube includes a number of apertures extending through the tube's sidewall surface.

14. The filter assembly of claim 10 wherein the pre-collector body component is positioned upstream of the filter element.

15. The filter assembly of claim 10 wherein the pre-collector body component is positioned substantially coaxially with the support frame.

16. The filter assembly of claim 10 wherein the difference in the first electric potential and the second electric potential is at least 20,000 volts.

17. A method for removing particulates suspended in a fluid flowing through a housing, the housing divided into a first plenum and a second plenum by a tube sheet, the first plenum in fluid communication with an inlet, the second plenum in fluid communication with an outlet, the tube sheet defining an aperture extending between the first plenum and the second plenum, the method comprising:
  providing a filter element having a first end and a second end, the first end sealingly coupled to the tube sheet and adjacent the aperture, the filter element extending from the tube sheet into the first plenum;
  providing a pre-collector body component located upstream of the filter element, the pre-collector body component comprising a substantially continuous sidewall surface, an open first end, and a closed second end;
  connecting the pre-collector body component open first end to the second end of the filter element;
  providing a discharge electrode;
  coupling the pre-collector body component to a first electric potential and the discharge electrode to a second electric potential wherein the first electric potential and the second electric potential are different so that at least a portion of the particles suspended in the fluid moving between the pre-collector body component and discharge electrode are attracted to one of the pre-collector body component or discharge electrode and any remaining particles are removed from the fluid as the fluid passes through the filter element.

18. The method of claim 17 wherein the first electric potential is ground and the second electronic potential is between negative 20,000 volts and negative 50,000 volts DC.

* * * * *